United States Patent
Wheeldon et al.

(10) Patent No.: US 10,691,861 B2
(45) Date of Patent: Jun. 23, 2020

(54) INTEGRATED CIRCUIT DESIGN

(71) Applicant: Arm Limited, Cambridge (GB)

(72) Inventors: Adrian Reece Wheeldon, Newcastle Upon Tyne (GB); John Philip Biggs, Cambridge (GB); Jedrzej Kufel, Littleport (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/166,399

(22) Filed: Oct. 22, 2018

(65) Prior Publication Data
US 2020/0125691 A1     Apr. 23, 2020

(51) Int. Cl.
*G06F 30/39* (2020.01)
*G06F 30/30* (2020.01)
*G06F 30/392* (2020.01)
*G06F 30/398* (2020.01)
*G06F 17/50* (2006.01)

(52) U.S. Cl.
CPC ............ *G06F 30/392* (2020.01); *G06F 30/30* (2020.01); *G06F 30/398* (2020.01)

(58) Field of Classification Search
CPC ......................... G06F 17/5045; G06F 17/5072
USPC .................................................. 716/118, 119
See application file for complete search history.

(56) References Cited

U.S. PATENT DOCUMENTS

| | | | | |
|---|---|---|---|---|
| 6,370,078 B1 * | 4/2002 | Wik et al. | ................ | G11C 7/18 365/156 |
| 6,498,758 B1 * | 12/2002 | Ponnar et al. | ........... | G11C 7/18 365/189.04 |
| 6,541,155 B2 * | 4/2003 | Guindy et al. | ...... | H01M 2/1673 429/127 |
| 6,651,225 B1 * | 11/2003 | Lin et al. | ............ | G06F 17/5022 716/113 |
| 6,665,204 B2 * | 12/2003 | Takeda | ..................... | G11C 7/18 257/E21.657 |
| 7,930,652 B2 * | 4/2011 | Wood | .................. | G06F 17/5036 716/113 |
| 8,549,447 B2 * | 10/2013 | Eisenstadt | ........... | G06F 17/5054 716/100 |
| 8,638,663 B2 * | 1/2014 | Suzuki | .................... | H04L 63/08 370/230.1 |
| 2012/0250443 A1 * | 10/2012 | Saraswat | .................. | G11C 5/14 365/226 |

OTHER PUBLICATIONS

Loh et al., "Processor Design in 3D Die-Stacking Technologies", *IEEE Micro*, vol. 27, issue 3, May-Jun. 2007, 18 pages.
Loh et al., "Processor Design in 3D Die-Stacking Technologies", *IEEE Micro*, vol. 27, issue 3, published Aug. 20, 2007, 18 pages.

* cited by examiner

*Primary Examiner* — Sun J Lin
(74) *Attorney, Agent, or Firm* — Nixon & Vanderhye P.C.

(57) ABSTRACT

Disclosed herein is an apparatus that includes a first pair of signal lines and a second pair of signal lines. Each pair of signal lines comprises a first line and a second line that collectively signal any one of: a logical zero, a logical one, and nothing. A first cell occupies a first layer of the apparatus to receive the first line of the first pair of signal lines and the first line of the second pair of signal lines; and a second cell occupies a second layer of the apparatus to receive the second line of the first pair of signal lines and the second line of the second pair of signal lines. The first cell is a dual of the second cell and at least partially overlaps the second cell.

19 Claims, 4 Drawing Sheets

INTEGRATED CIRCUIT DESIGN

TECHNICAL FIELD

The present technique relates to the field of integrated circuits, particularly the design of integrated circuits.

DESCRIPTION

There is an increasing interest in three-dimensional integrated circuits (3DICs) comprising multiple tiers of active devices. Such three-dimensional integrated circuits can be more space efficient than two-dimensional counterparts. Whereas circuit design tools can be used to place active components efficiently, such a process becomes very computationally complex when multiple layers are to be taken into account.

SUMMARY

Viewed from a first example configuration, there is provided an apparatus comprising: a first pair of signal lines and a second pair of signal lines, each pair of signal lines comprising a first line and a second line that collectively signal any one of: a logical zero, a logical one, and nothing; a first cell occupying a first layer of the apparatus to receive the first line of the first pair of signal lines and the first line of the second pair of signal lines; and a second cell occupying a second layer of the apparatus to receive the second line of the first pair of signal lines and the second line of the second pair of signal lines, wherein the first cell is a dual of and at least partially overlaps the second cell.

Viewed from a second example configuration, there is provided a method of generating an electronic design representing at least part of a dual-rail 3D integrated circuit, the method comprising: receiving an electronic design representing a first layer of the dual-rail 3D integrated circuit; and generating an electronic design representing a second layer of the dual-rail 3D integrated circuit by replacing at least some components in the electronic design of the first layer with their dual.

Viewed from a third example configuration, there is provided a non-transitory storage medium comprising an electronic design representing an apparatus comprising: a first pair of signal lines and a second pair of signal lines, each pair of signal lines comprising a first line and a second line that collectively signal any one of: a logical zero, a logical one, and nothing; a first cell occupying a first layer of the apparatus to receive the first line of the first pair of signal lines and the first line of the second pair of signal lines; and a second cell occupying a second layer of the apparatus to receive the second line of the first pair of signal lines and the second line of the second pair of signal lines, wherein the first cell is a dual of and at least partially overlaps the second cell.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
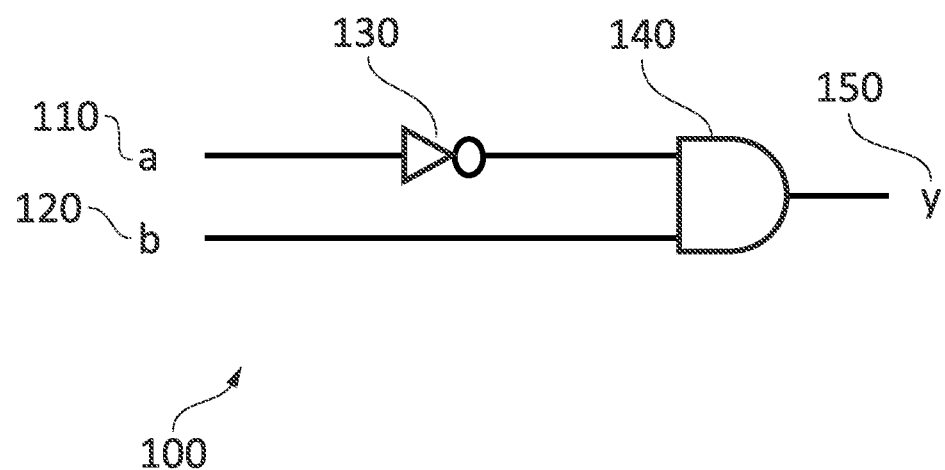
FIG. 1 illustrates a digital circuit using a single rail.

Before discussing the embodiments with reference to the accompanying figures, the following description of embodiments is provided.

In accordance with one example configuration there is provided an apparatus comprising: a first pair of signal lines and a second pair of signal lines, each pair of signal lines comprising a first line and a second line that collectively signal any one of: a logical zero, a logical one, and nothing; a first cell occupying a first layer of the apparatus to receive the first line of the first pair of signal lines and the first line of the second pair of signal lines; and a second cell occupying a second layer of the apparatus to receive the second line of the first pair of signal lines and the second line of the second pair of signal lines, wherein the first cell is a dual of and at least partially overlaps the second cell.

Dual-signal rails use a pair of signal lines in order to collectively indicate a logical '0', a logical '1', or the fact that no signal is currently being transmitted (a fourth possibility could include an "error" signal). Typically, one of the signal lines can indicate a logical "1" by being asserted, while the other signal line can indicate a logical "0" by being asserted. When neither line is asserted, no signal is being transmitted. In some instances, simultaneous signalling of both lines could be considered to be an error condition. Transmitting single values therefore require pairs of lines and thus, it will be appreciated that such systems involve a dramatic increase in the total number of signal lines and the complexity of the signal line layout required in the apparatus. For instance, four signal lines are required for use with cell (e.g. containing an active component such as a gate) that receives two values such as certain logical AND or OR gates. In the above embodiments, one of each pair of signal lines is received by the desired cell and the other signal line in the pair is received by the dual of that cell. The dual of a cell can be determined according to The Duality Principle (also known as De Morgan duality). In summary, the dual is the operator that will produce the same result if all the inputs and outputs are inverted. So for an AND gate:

| a | b | Result |
|---|---|--------|
| 0 | 0 | 0 |
| 0 | 1 | 0 |
| 1 | 0 | 0 |
| 1 | 1 | 1 |

If these inputs and outputs are inverted, we get the table:

| a | b | Result |
|---|---|--------|
| 1 | 1 | 1 |
| 1 | 0 | 1 |
| 0 | 1 | 1 |
| 0 | 0 | 0 |

And it will be appreciated that this is the Boolean truth table for an OR gate, which is the dual of an AND gate. In the above embodiments, one layer of the circuitry comprises the desired cell, and the other layer of the circuitry comprises the desired cell's dual with the dual also receiving one signal line from each pair of signal lines. The cell and its dual are placed on top of one another such that they at least partly overlap. In this way, a three dimensional dual-signal rail circuit can be devised by considering placement of only one layer, for which existing EDA tools already exist. Furthermore, such placement may not require excessive wiring since each signal line and cell can be "mirrored". Within placement tools, the "cell size" would generally be expected to be the same between a cell and its dual, and hence, such "mirroring" should be suitable for the apparatus.

In some embodiments, each pair of signal lines is split across the first layer and the second layer.

In some embodiments, the apparatus comprises inversion circuitry to invert inputs to the first cell and the second cell. The term "inversion" here refers to a logical inversion. For instance, when a cell would ordinarily receive the logical value '0' the inversion circuitry causes the cell to receive the logical value '1' and vice-versa. In these embodiments, the inversion circuitry inverts the logical value received for the input of both the cell and its dual. Note that where 'nothing' is being inverted, the result will still be 'nothing'.

In some embodiments, the inversion circuitry is adapted to swap the first line and the second line of one of: the first pair of signal lines and the second pair of signal lines. By swapping the first line and the second line, i.e. by causing the first line to be provided to where the second line was directed and by causing the second line to be provided to where the first line was directed, inversion can be achieved. This is because one line is naturally the inversion of the other (provided one of the lines is being asserted).

There are a number of ways of swapping the lines. However, in some embodiments, the inversion circuitry comprises a pair of vias. A via allows a signal in one layer of an integrated circuit to be provided to another layer of an integrated circuit. Inversion of a signal can therefore be achieved using a pair of vias, rather than necessarily needing additional logical gates or transistors. The space required by the circuitry can therefore be reduced as compared to circuitry where inversion if achieved by transistors. This can lead to a reduction of energy consumption.

In some embodiments, the apparatus is asynchronous. Asynchronous circuitry is unclocked. That is, the output of a particular value on the signal lines is not linked to the periodic assertion of another signal such as a clock signal. Dual-signal lines are particularly well suited to use in asynchronous circuitry. This is because the transition of a signal line can be used to indicate when a new value is being transmitted (rather than requiring a new value to be transmitted in response to a clock signal).

In some embodiments, the apparatus is an NCL-X circuit. A Null Convention Logic (NCL) circuit is one in which the signal remains NULL (e.g neither a '0' or '1' is indicated) until something is to be transmitted. This can be implemented using dual-signal rails as previously discussed. The "X" of NCL-X refers to the fact that completion detection (e.g. a mechanism to determine whether a value is present or not, and to interpret it) is decoupled from computation logic.

In some embodiments, the apparatus is a 3D integrated circuit. In a 3D integrated circuit, active components such as transistors and gates (rather than merely wires) are placed at multiple layers within the circuitry. Each active component can therefore be placed within a three-dimensional space having (x, y, z) coordinates. Placing components in this manner can lead to more space-efficient designs that require less (or shorter) wiring between components, thereby improving the speed of signal transmission and power consumption.

In some embodiments, the placement of corresponding elements in the first layer and the second layer is symmetrical. For instance, for each cell in one of the two layers, its dual is placed symmetrically in the other of the two layers.

In accordance with another example configuration, there is provided a method of generating an electronic design representing at least part of a dual-rail 3D integrated circuit, the method comprising: receiving an electronic design representing a first layer of the dual-rail 3D integrated circuit; and generating an electronic design representing a second layer of the dual-rail 3D integrated circuit by replacing at least some components in the electronic design of the first layer with their dual.

Such a method could, for instance, be computer-implemented using Electronic Design Automation (EDA) tools such as "place and route" tools. Such tools take a set of requirements and compute the best location for each cell (one or more active components such as gates) based on their connectivity requirements in order to reduce wiring lengths between cells. The output is then an electronic design that represents the circuit. This can be provided to chip foundries, for instance, for the chip to be manufactured. However, such tools are limited in that performing such calculations in three dimensions (as opposed to two dimensions) becomes significantly more complicated. Thus, in the above embodiments, an electronic design for a first layer can be determined (using EDA tools for instance). This can then be used to produce a second layer, by replacing components in the first layer by their dual. This includes the signal lines (e.g. where one of a pair of signal lines is provided in the first layer, the other signal line is provided for the second layer). This method quickly produces a 3D design (of two layers) whose component placement is efficient.

Particular embodiments will now be described with reference to the figures.

FIG. 1 illustrates a digital circuit 100 that uses a single rail. The circuit receives two values, a 110 and b 120. Either of these values could be a '0' or a '1'. The value a is inverted by an inverter 130. The result, along with the value b are then provided to an AND gate 140. The AND gate outputs a result y 150 whose value is dependent on the two values that are received by the AND gate. The result can be summarised according to the following Boolean truth-table:

| a | b | inverted a | y |
|---|---|---|---|
| 1 | 1 | 0 | 0 |
| 1 | 0 | 0 | 0 |
| 0 | 1 | 1 | 1 |
| 0 | 0 | 1 | 0 |

This example shows a single rail. Typically, therefore, if the design were of synchronous design using flip-flops, a clock signal would be provided in order to indicate when the value of y should be considered. Without such a signal, it is not known whether or when a new value is being presented by the AND gate 140 or not.

Figure 2:
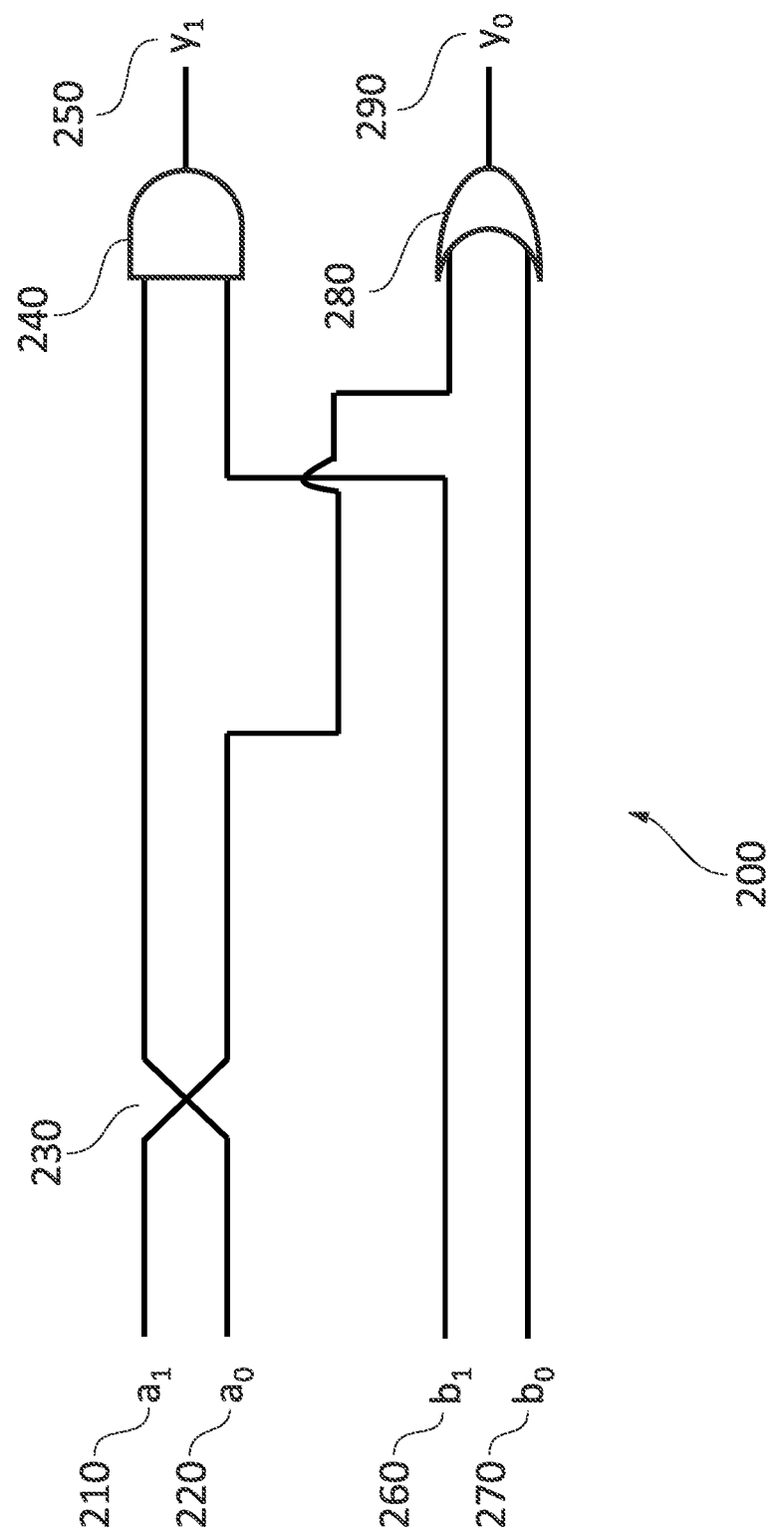
FIG. 2 illustrates a corresponding digital circuit using dual-signal rails.

FIG. 2 illustrates the corresponding digital circuit 200 to that of FIG. 1 using dual-signal rails. In this example, pairs of signal lines are used to transmit each value. Again, two values are transmitted. Consequently, a first pair of signal lines $a_1$ 210 and $a_0$ 220 are used to provide the value 'a' and a second pair of signal lines $b_1$ 260 and $b_0$ 270 are used to provide the value 'b'. Whenever a line transmits a '0', this indicates that no value is being transmitted by that line. Whenever a line transmits in asserted (e.g. when it transmits a logical '1'), this indicates that a value is being transmitted. The subscript provided for each line indicates the value that is indicated. For instance, the line $a_0$ indicates a logical '0' when it is asserted. Similarly, the line $b_1$ indicates a logical '1' when it is asserted. When no lines are asserted, nothing is being transmitted.

A single output is provided in the form of two signal lines y1 250 and y0 290. Again, these can be used to indicate a logical '0' or a logical '1' in the manner previously described. In this example, inversion is achieved by a rail crossing 230 in which the positive (e.g. $a_1$) and negative rails/signal lines (e.g. $a_0$) are switched. Such rail crossings can create routing congestion that leads to a complex set of wiring between components. In this example, an AND gate 240 is again provided. However, the AND gate 240 does not receive all four signal lines, but instead receives one signal line for each input value. Here, the input values are a and b, and so, the AND gate 240 receives one signal line 220 from the input value a and another signal line 260 from the input value b. Where the value a is to be taken, the AND gate 240 receives the positive signal line. Where the value (not a) is to be taken, the AND gate 240 receives the negative signal line. In addition to the AND gate 240, an OR gate 280 is provided as the dual of the AND gate 240. The OR gate 280 receives the corresponding (e.g. opposite) signal lines to those received by the AND gate 240. Typically, the dual can be determined by simply swapping AND gates with OR gates and vice-versa.

As a consequence of the above circuit design, no clock signal is needed since the "no transmission" state that is achieved by no signal line being asserted can be used as a spacer between transmitted values. In this example, assertion is considered to correspond with a signal line transmitting the value "1". However, It will be appreciated that assertion could alternatively correspond with the case when a logical '0' is transmitted.

Figure 3:
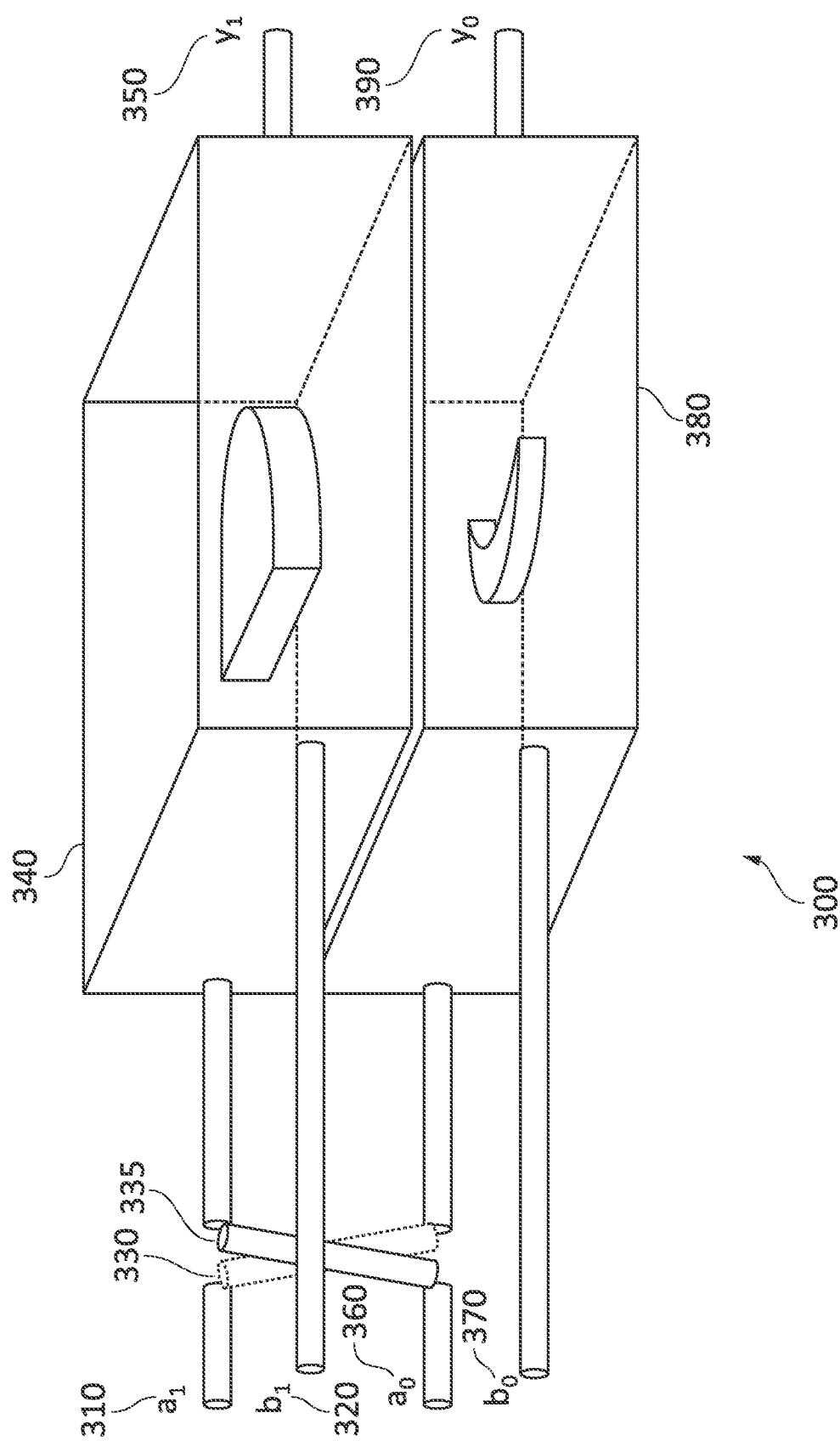
FIG. 3 illustrates a 3D integrated circuit using dual-signal rails in accordance with some embodiments.

FIG. 3 schematically illustrates the design of a 3D integrated circuit 300 that corresponds with the 2D dual-signal rail design illustrated in FIG. 2. This example comprises a first layer that includes one of the 'a' signal lines 310, one of the 'b' signal lines 320, one of the two cells 340, and one of the output 'y' signal lines 350. A second layer includes the other of the 'a' signal lines 360, the other of the 'b' signal lines 370, a dual 380 of the cell 340, and the other output 'y' signal line 390. The layers are stacked on top of each other. It will be appreciated that placement of components between the layers is symmetrical. In particular, the two layers follow each other almost identically with the inverse signal line following its partner, and with the placement of active components being "mirrored" between the two layers.

A pair of vias 330, 335 can be used to invert the 'a' rails that are provided to each of the cells 340, 380, therefore achieving an inversion of the signal 'a' that is provided to each of the cells 340, 380. The vias are used to propagate the signal between layers. Consequently, routing congestion within each individual layer can be eased as compared to using rail crossings. Between the layers, each cell and its dual are stacked on top of each other and thus at least partly overlap. It will be appreciated that the actual logical components within the cell could be of slightly different sizes. For instance, in the example of FIG. 3, the OR gate in the dual cell 380 is shown as being smaller than the AND gate in the main cell 340, and thus an overlap of the active components themselves might not be achieved (depending on exactly how the active components are placed within the cells). As a consequence of this design, the wiring on any individual layer becomes simpler and thus less prone to congestion. In addition, shorter wiring lengths can be used between components, thereby reducing power consumption as well as circuit space.

Figure 4:
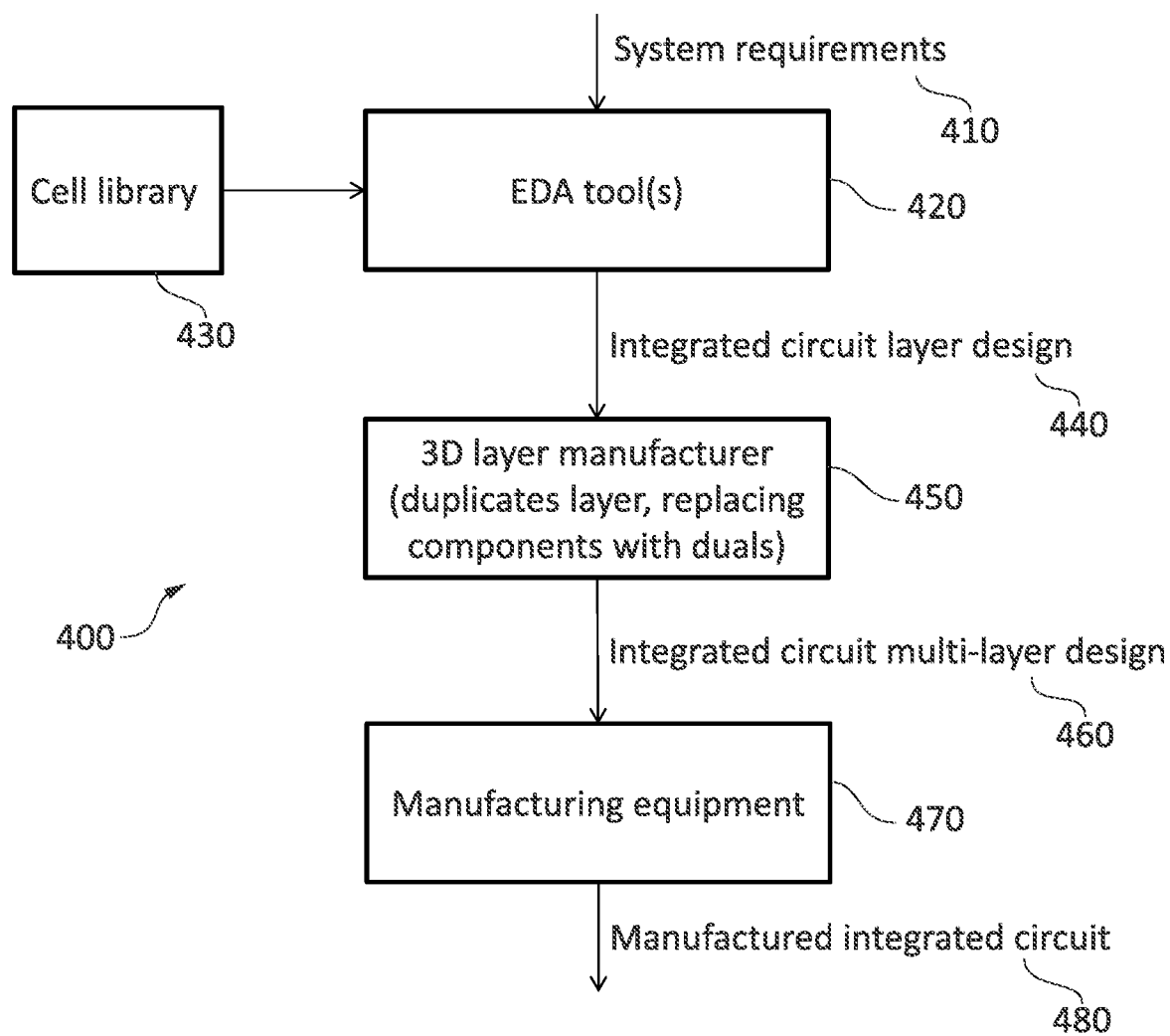
FIG. 4 shows a flowchart that illustrates a method of manufacturing a design of a 3D integrated circuit using dual-signal rails in accordance with some embodiments.

FIG. 4 shows a flowchart 400 that illustrates a method of manufacturing a design of a 3D integrated circuit using dual-signal rails such as the one shown in FIG. 3 in accordance with some embodiments. This process can be used as part of an electronic design process that could use automated design techniques to simplify the process of assembling circuitry. A system designer or an electronic design tool performing an earlier stage of the design process may specify various system requirements 410, such as the physical position of ports to be used for the integrated circuits, and/or expected usage requirements (e.g. which ports are likely to require communication links between them and the expected levels of bandwidth). An EDA tool executed on a data processing apparatus may use the system requirements 410, together with a cell library 430 providing a high level representation of the various components which can be selected for assembling the circuitry, to generate an electronic design file 440 which provides a layout of the components on a first layer of the circuitry and specifies various parameters of those components such as parameters for configuring the particular properties of the components. The design 440 specifies particular gates or transistors to be generated for one layer of the integrated circuit. The EDA tool may determine where particular gates or components should be located in order to achieve particular timings or power efficiencies. Analysis may be carried out in order to test the timing requirements (e.g. for setup and hold violations), and may iterate the design if earlier attempts fail the timing analysis. This layer description can then be used by a 3d layer manufacturer 450 that takes the first layer descriptor 440 and uses it to generate a second layer descriptor that collectively makes a design for the entire integrated circuit 460. This is achieved by replacing signal lines and components with their duals. The resulting overall design 460 can be provided to, for instance, a foundry that uses manufacturing equipment 470 to generate the final manufactured integrated circuit 480.

It will be appreciated that the integrated design 460 could also be provided on various forms of storage media such as a DVD, USB stick, CD-ROM, floppy disk, hard disk or other form of static or magnetic storage device, or transmitted electronically as a signal over a network such as the internet for instance.

Similarly, the techniques described here could be used to build much larger circuits than those that are described here such as processors, Arithmetic or Floating point logic units, memory access systems, data storage circuitry, etc. Indeed, the present techniques could be applied to many systems that make use of logic gates.

In this way, rather than the EDA tools having to consider placement for multiple layers at the same time, it is possible to consider only one of the layers and to provide an electronic design file for that layer. The design for further layers can then be generated from the first layer by replacing components with their duals, which is a straightforward process. In some cases, timing analysis may be avoidable provided that the timing analysis of the first layer is passed, since the second layer that is generated from the first layer.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
a first pair of signal lines and a second pair of signal lines, each pair of signal lines comprising a first line and a second line that collectively signal any one of: a logical zero, a logical one, and nothing;
a first cell occupying a first layer of the apparatus to receive the first line of the first pair of signal lines and the first line of the second pair of signal lines; and
a second cell occupying a second layer of the apparatus to receive the second line of the first pair of signal lines and the second line of the second pair of signal lines, wherein
the first cell is a dual of the second cell and at least partially overlaps the second cell.

2. Apparatus according to claim 1, wherein
each pair of signal lines is split across the first layer and the second layer.

3. Apparatus according to claim 1, comprising:
inversion circuitry to invert inputs to the first cell and the second cell.

4. Apparatus according to claim 3, wherein
the inversion circuitry is adapted to swap the first line and the second line of one of: the first pair of signal lines and the second pair of signal lines.

5. Apparatus according to claim 3, wherein
the inversion circuitry comprises a pair of vias.

6. Apparatus according to claim 1, wherein
the apparatus is asynchronous.

7. Apparatus according to claim 1, wherein
the apparatus is an NCL-X circuit.

8. Apparatus according to claim 1, wherein
the apparatus is a 3D integrated circuit.

9. Apparatus according to claim 1, wherein
a placement of corresponding elements in the first layer and the second layer is symmetrical.

10. A method of generating an electronic design representing at least part of a dual-rail 3D integrated circuit, the method comprising:
receiving an electronic design representing a first layer of the dual-rail 3D integrated circuit; and
generating an electronic design representing a second layer of the dual-rail 3D integrated circuit by replacing at least some components in the electronic design of the first layer with dual components of said at least some components.

11. A non-transitory storage medium comprising an electronic design representing an apparatus comprising:
a first pair of signal lines and a second pair of signal lines, each pair of signal lines comprising a first line and a second line that collectively signal any one of: a logical zero, a logical one, and nothing;
a first cell occupying a first layer of the apparatus to receive the first line of the first pair of signal lines and the first line of the second pair of signal lines; and
a second cell occupying a second layer of the apparatus to receive the second line of the first pair of signal lines and the second line of the second pair of signal lines, wherein
the first cell is a dual of the second cell and at least partially overlaps the second cell.

12. The non-transitory storage medium according to claim 11, wherein
each pair of signal lines is split across the first layer and the second layer.

13. The non-transitory storage medium according to claim 11, wherein the apparatus comprises:
inversion circuitry to invert inputs to the first cell and the second cell.

14. The non-transitory storage medium according to claim 13, wherein
the inversion circuitry is adapted to swap the first line and the second line of one of: the first pair of signal lines and the second pair of signal lines.

15. The non-transitory storage medium according to claim 13, wherein
the inversion circuitry comprises a pair of vias.

16. The non-transitory storage medium according to claim 11, wherein
the apparatus is asynchronous.

17. The non-transitory storage medium according to claim 11, wherein
the apparatus is an NCL-X circuit.

18. The non-transitory storage medium according to claim 11, wherein
the apparatus is a 3D integrated circuit.

19. The non-transitory storage medium according to claim 11, wherein
a placement of corresponding elements in the first layer and the second layer is symmetrical.

* * * * *